United States Patent
Lerner et al.

(10) Patent No.: US 8,005,149 B2
(45) Date of Patent: Aug. 23, 2011

(54) TRANSMISSION OF STREAM VIDEO IN LOW LATENCY

(75) Inventors: Moshe Lerner, Petah-Tikva (IL); Ofer Bahar, Tel-Mond (IL); Ariel Nagauker, Lod (IL); Tal Avidor, Rosh Ha'ayin (IL)

(73) Assignee: Unisor Design Services Ltd., Tel Aviv (IL)

( * ) Notice: Subject to any disclaimer, the term of this patent is extended or adjusted under 35 U.S.C. 154(b) by 1419 days.

(21) Appl. No.: 11/428,493

(22) Filed: Jul. 3, 2006

(65) Prior Publication Data
US 2008/0055463 A1    Mar. 6, 2008

(51) Int. Cl.
*H04N 7/12*  (2006.01)
*H04N 7/173* (2011.01)
(52) U.S. Cl. .................... 375/240.26; 725/95
(58) Field of Classification Search ........... 375/240.01, 375/240.24, 240.26; 725/95; 709/231
See application file for complete search history.

(56) References Cited

U.S. PATENT DOCUMENTS

| | | | |
|---|---|---|---|
| 5,691,768 A * | 11/1997 | Civanlar et al. | 375/240.01 |
| 6,665,872 B1 * | 12/2003 | Krishnamurthy et al. | 725/95 |
| 2003/0229901 A1 * | 12/2003 | Amir et al. | 725/95 |
| 2005/0060421 A1 * | 3/2005 | Musunuri et al. | 709/231 |
| 2007/0086528 A1 * | 4/2007 | Mauchly et al. | 375/240.24 |

* cited by examiner

*Primary Examiner* — Gims S Philippe
(74) *Attorney, Agent, or Firm* — Martin Fleit; Paul D. bianco; Fleit Gibbons Gutman Bongini & Bianco PL

(57) ABSTRACT

The present invention is a new and innovative system and method for the stream transmission of video data. The disclosed invention enables a significant reduction in latency and in start decoding and displaying parameters in the transmission of the video data in comparison with existing stream video transmission methods. According to the some embodiments of the present invention each frame or each field is sliced into a predetermined number of slices. Each slice is compressed separately, using standard video compression technologies. The compressed slices are then compounded together before being transmitted over the communication network. On the receiving end the frame is reassembled and decompressed. Finally the frame is recomposed accordingly and filtered to provide a high quality video image.

5 Claims, 8 Drawing Sheets

TRANSMISSION OF STREAM VIDEO IN LOW LATENCY

FIELD OF THE INVENTION

The present invention relates in general to the field of stream transmission of video data, more particularly the present invention relates to systems and methods for low latency stream transmission of video data.

BACKGROUND

The field of stream transference of video data is one of the rapidly growing segments in the technologies of data communications. However, present day art has several shortcomings which pose limitations on the services provided by stream video. Current systems employ buffering and multiple retransmissions to guarantee the correct reception of each packet. This leads to high latency in media delivery. These technologies present a tradeoff in which high quality images are transmitted with relatively high latency, and low-latency video decreases video quality.

There is therefore a need for a system and a method for enabling the transmission of high quality video in low-latency. Known in the art are several solutions for providing low-latency transmission of stream video, however, none of these solution enables reducing latency down to 25 msec on standard codecs such as Moving Picture Experts Group (MPEG) codecs.

SUMMARY

Disclosed is a method for transferring real-time video stream through communication network. The video stream is compressed using standard codec techniques. The method comprises the step of dividing each video frame into a predetermined number of slices, wherein each slice is compressed separately and transmitting a reference frame relating to at least one video frame slice. The size of each slice may be determined in accordance with the desired image motion resolution at each region of the video frame, or in accordance with the region of interest of the video frame. The region of interest of the frame may be compressed separately and treated as independent video source which is divided into a predetermined number of slices and transmitted within a separate stream wherein at least partial area of the region of interest includes at least one partial part of a slice.

The reference frame of each slice may be transmitted in a different timeframe. The method may transmit only one reference frame at each timeframe, all other slices in this timeframe are transmitted as non-referential frames. Alternatively, several reference frames may be transmitted in the same timeframe, and there may be timeframes in which no reference frames are transmitted. The transmission of the reference frame may be regulated in accordance with the frame content.

The compressed video frame slices and/or the region of interest slices are compounded together before transmitting them over a communication network. On the receiving end, the video frame slices are reassembled from the transmitted slices and the video stream is decompressed. The recomposed video frame may be filtered to improve image video quality. An optimization algorithm may be applied for calculating the transmission timing of each slice of the video frame. The buffer size may be determined in accordance with the size of frame slices.

The method may also include means for transmitting video streams from more than one source simultaneously. The method also includes the step of transmitting the reference frame of one video source at the same stream of a second video source stream.

Also disclosed is a system for transferring real-time video stream through communication network, wherein said stream is compressed using standard codec technique. The system is comprised of a slicer module for dividing each video frame into a predetermined number of slices, a codec module for compressing each slice separately and a controller module for transmitting segmented reference frame relating to at least one video frame slice. The system may also include a multiplexer module for compounding the video frame slices, and a de-multiplexer module for decompounding the video frame slices.

The compression module may generate an independent slice image per each video slice. The compression module may be applied separately to the slices of the region of interest. The system may also include a frame composer module for assembling the decompressed slices and regions of interest into the reconstructed video frame. According to some embodiments the reconstructed video frame maintained approximately at least some of the features of the original video stream.

The system may also include a processing module for providing a processed decoded video stream on which video filters can be activated on the whole frame eliminating the slicing artifacts. At least a part of the modules of the system may be implemented as Field-Programmable Gate Array. A video stabilizer may also be included which is activated separately on each video frame slice. An inter-slice information processing module, which provides an improved bit rate variance performance, may also be included.

BRIEF DESCRIPTION OF THE DRAWINGS

These and further features and advantages of the invention will become more clearly understood in the light of the ensuing description of a preferred embodiment thereof, given by way of example, with reference to the accompanying drawings, wherein—

DETAILED DESCRIPTION

Figure 1:
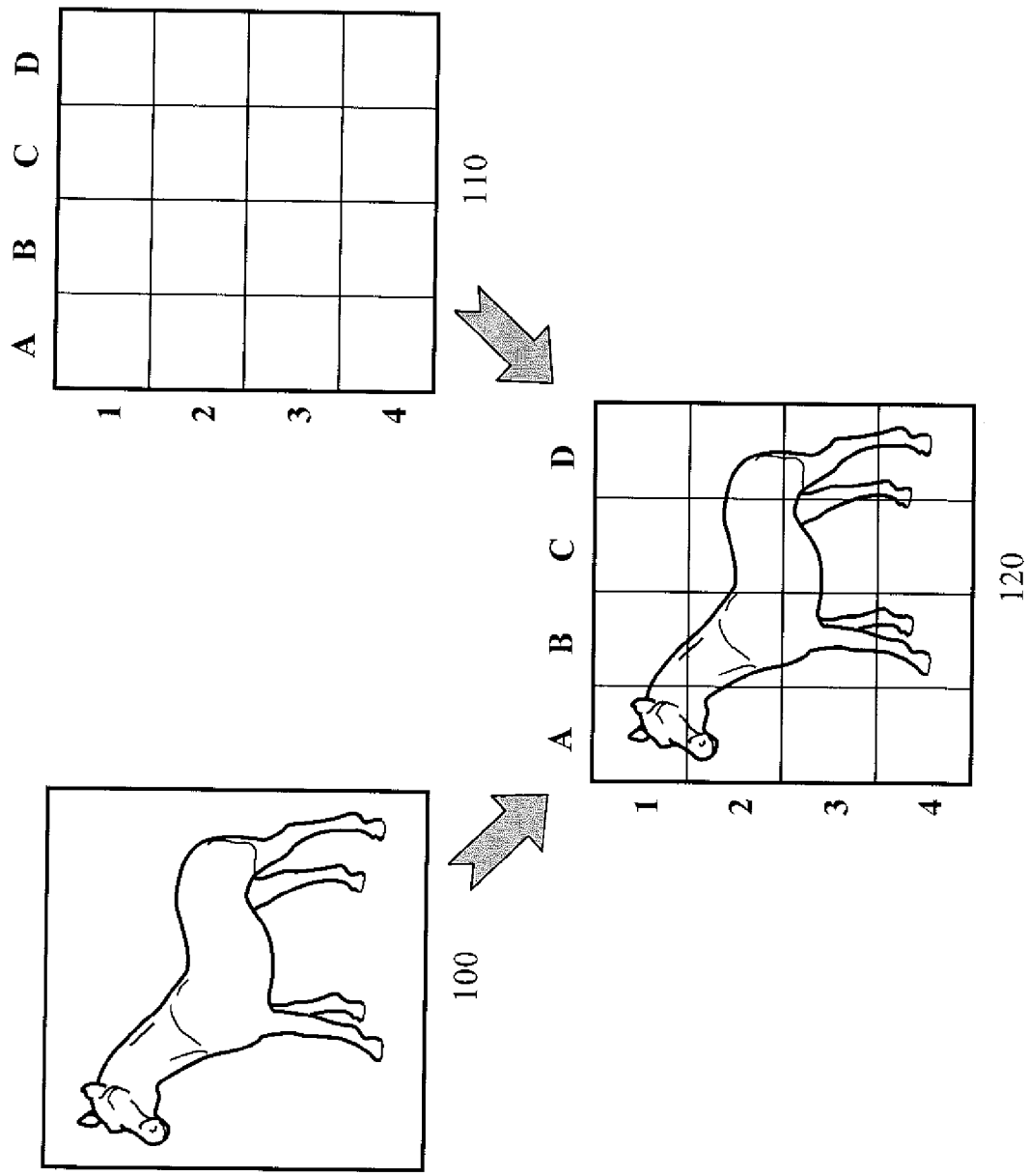
FIG. 1 is an illustration of the frame slicing principle in accordance with the some embodiments of the present invention.

An embodiment is an example or implementation of the inventions. The various appearances of "one embodiment,"

"an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions.

It is understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" refers to manners, means, techniques and procedures for accomplishing a given task including, but not limited to, those manners, means, techniques and procedures either known to, or readily developed from known manners, means, techniques and procedures by practitioners of the art to which the invention belongs.

Meanings of technical and scientific terms used herein are to be commonly understood as by one of ordinary skill in the art to which the invention belongs, unless otherwise defined.

The present invention is a new and innovative system and method for the stream transmission of video data. The disclosed invention enables a significant reduction in latency and in start decoding and displaying parameters in the transmission of the video data in comparison with existing stream video transmission methods. According to the some embodiments of the present invention each frame or each field is sliced into a predetermined number of slices. Each slice is compressed separately, using standard video compression technologies. The compressed slices are then compounded together before being transmitted over the communication network. On the receiving end the frame is reassembled and decompressed. Finally the frame is recomposed accordingly and filtered to provide a high quality video image.

FIG. 1 illustrates one possible slicing method in accordance with the present invention. The original frame 100 is sliced according to a predetermined frame slicing method 110 to produce the sliced frame 120. In the illustrated example the frame slicing method 110, which may be, for example Common Intermediate Format (CIF), a Quarter CIF (QCIF) or QQCIF, simply divide the frame into equal sized slices. Other methods of slicing the frame may divide it into unequal slices according to the desired image and motion resolution in the video. In such cases smaller size slices may be created in the regions of interest (ROI) in the frame. For instance, in a video conferencing video stream most of the relevant information is expected to be situated in the center of the frame. The frame may therefore be sliced in a manner which produces larger slices at the frame periphery and smaller ones in the frame center. Similarly, the frames or fields may be sliced into any arbitrary dimensions.

According to some embodiments of the present invention the region of interest of the frame may be compressed separately and transmitted within a separate stream, The region of interest may be uncorrelated to the video frame slicing regions, hence a slice may include a partial area of the region of interest or the region of interest may include more than one slice.

According to some embodiments the splitter produces a multi video stream in which each stream maintains approximately at least some of the features as those of the original video stream, such as frame rate, color features, interlaced/progressive, except for the resolution rate. The resolution of each slice is determined according to its size in relation to the original frame. Each video stream is then compressed separately using one of the standard compression technologies. These compression technologies may include one of the Moving Picture Experts Group (MPEG) compressor/decompressor (codec) methods, such as MPEG1, MPEG2 or MPEG4, Audio Video Interleave (AVI) codec or any other codec known to people who are skilled in the art. Since the proposed system and method may operate using any codec type, it is therefore codec independent. The codec parameters configuration provides optimization of compressed video bit rate deviation, calculated for whole frame, using slice reference frame distribution over the whole frame.

Figure 2:
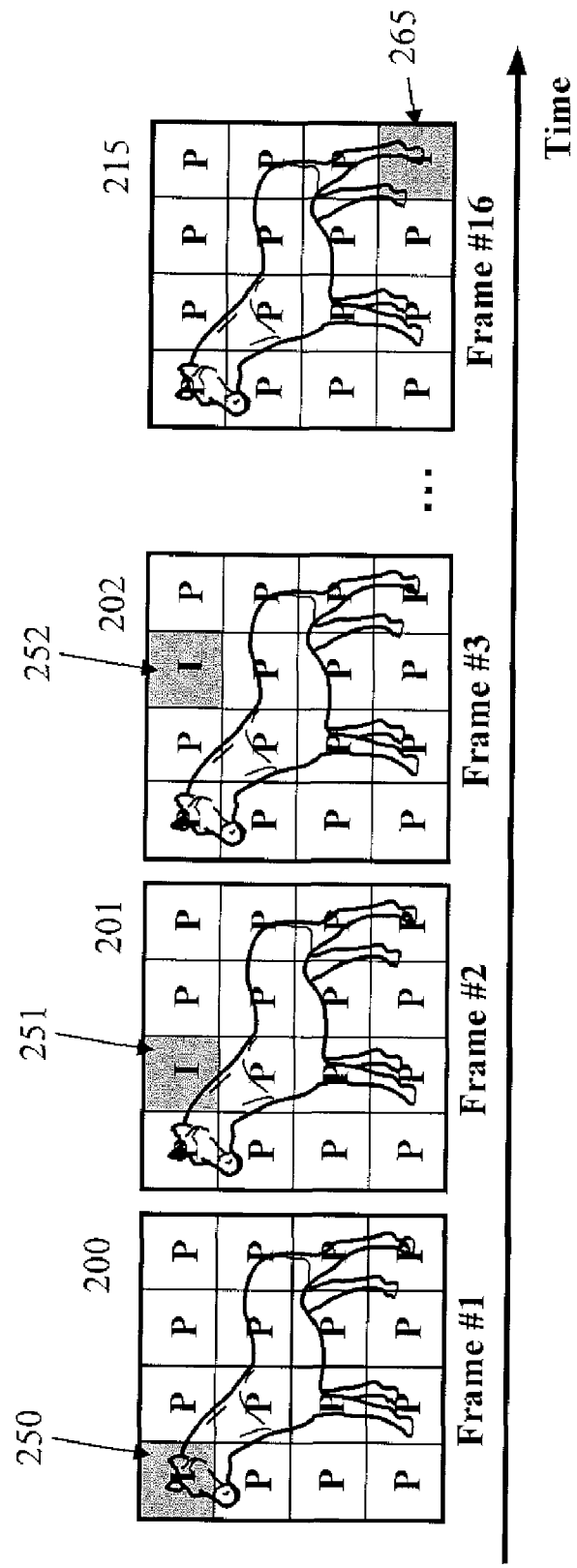
FIG. 2 is an illustration of the method of managing the transmission of the reference frame for each slice over time in accordance with the some embodiments of the present invention.

FIG. 2 illustrates the method of management of transmitting the reference frame for each slice over time. According to some embodiment of the present invention the reference frame (I) of each slice is transmitted in a different timeframe. Thus, in Frame #1 200 only slice 250 is transmitted as a reference frame, all other slices in this timeframe are transmitted as non-referential frames (P). In Frame #2 201 only slice 251 is transmitted as a reference frame and in Frame #3 202 only slice 252 is the reference frame. Hence all other slices are transmitted as reference frames in the following frames until the last slice 265 is transmitted as a reference frame in Frame #16 215.

Regularly, each timeframe therefore consists of one I slice and fifteen P slices. According to additional embodiments of the present invention the transmission of the I and P slices in each frame may be regulated according to frame content. The method may be adopted to transmit more than one I frame whenever scene changes occur, or not to send any I slices when little change occurs. While algorithms of calculating the optimal timing for sending I frames are known in the art, the proposed method performs this calculation for each slice, producing a much more accurate result for the full frame.

Figure 8:
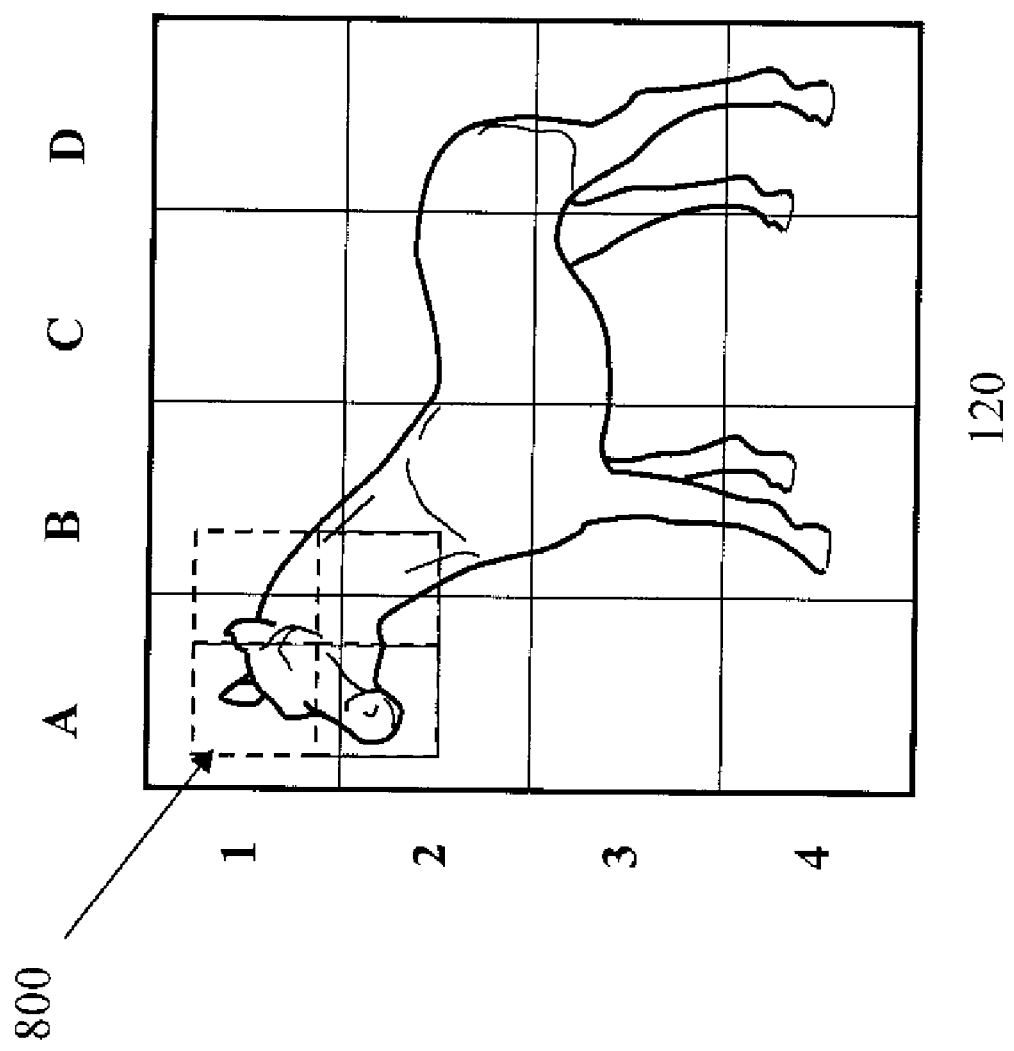
FIG. 8 is a exemplary image illustrating the a video frame in accordance with the some embodiments of the present invention.

Provided that a ROI is defined in the frame, additional treatment of this segment of the frame may be provided by some embodiments of the present invention. FIG. 8 is an illustration of the ROI frame slicing. ROI area 800 is defined in frame 120. Depending on its size, the area of ROI 800 may be treated as one slice or divided into several slices. The slices of ROI 800 are then compressed separately and added to the frame data as described above. This manner of treating the ROI area 800 increases the control over the bandwidth percentage dedicated to the transmission of ROI data.

All of the compressed slices are compound together in a dedicated protocol multiplexer and constant bit rate (CBR) shaper which is responsible for optimizing the CBR value using a sliding window algorithm. Together with a compatible protocol de-multiplexer on the receiving end of the communication link the multiplexer is capable of sending the stream over a serial packetized or non-packetized link. The dedicated multiplexer and de-multiplexer are adopted to ensure that the throughput effectiveness is maximal, CBR is minimal and latency is minimal. The protocol multiplexer de-multiplexer layers have the capabilities of handling the synchronization logic, fragmentation, reassembly and sequencing of packets.

Figure 3:
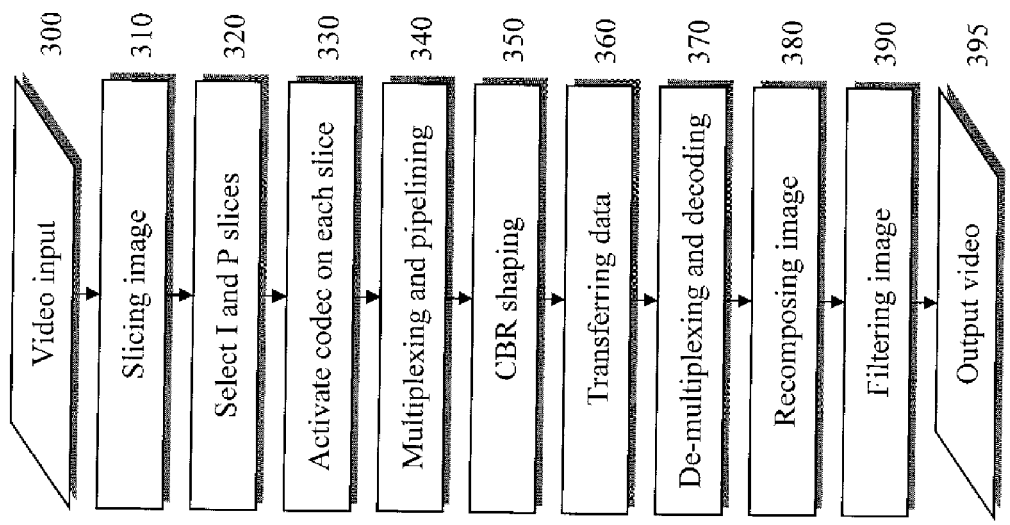
FIG. 3 is a flowchart illustrating the procedure of video transference in accordance with the some embodiments.

FIG. 3 is a flowchart illustrating the full procedure of transmitting video streams in accordance with the present invention. As abovementioned, the video data is received (step 300) and each frame or field is sliced according to the implemented slicing algorithm (step 310). Then the reference slices selection method selects which slices are sent as I slices, reference frames, and which ones are sent as P slices (step 320). Next the selected codec is activated separately on each slice (step 330). The compressed slices are compounded together by a dedicated multiplexer (step 340), transferred through the CBR shaper (step 350) and the data is transmitted over the communication line (step 360). On the receiving end the input video is divided back into multi video streams by the de-multiplexer and decompressed by the decoder (step 370). The image is then recomposed (step 380) and filtered (step 390) to improve image quality in output video (step 395).

Figure 4:
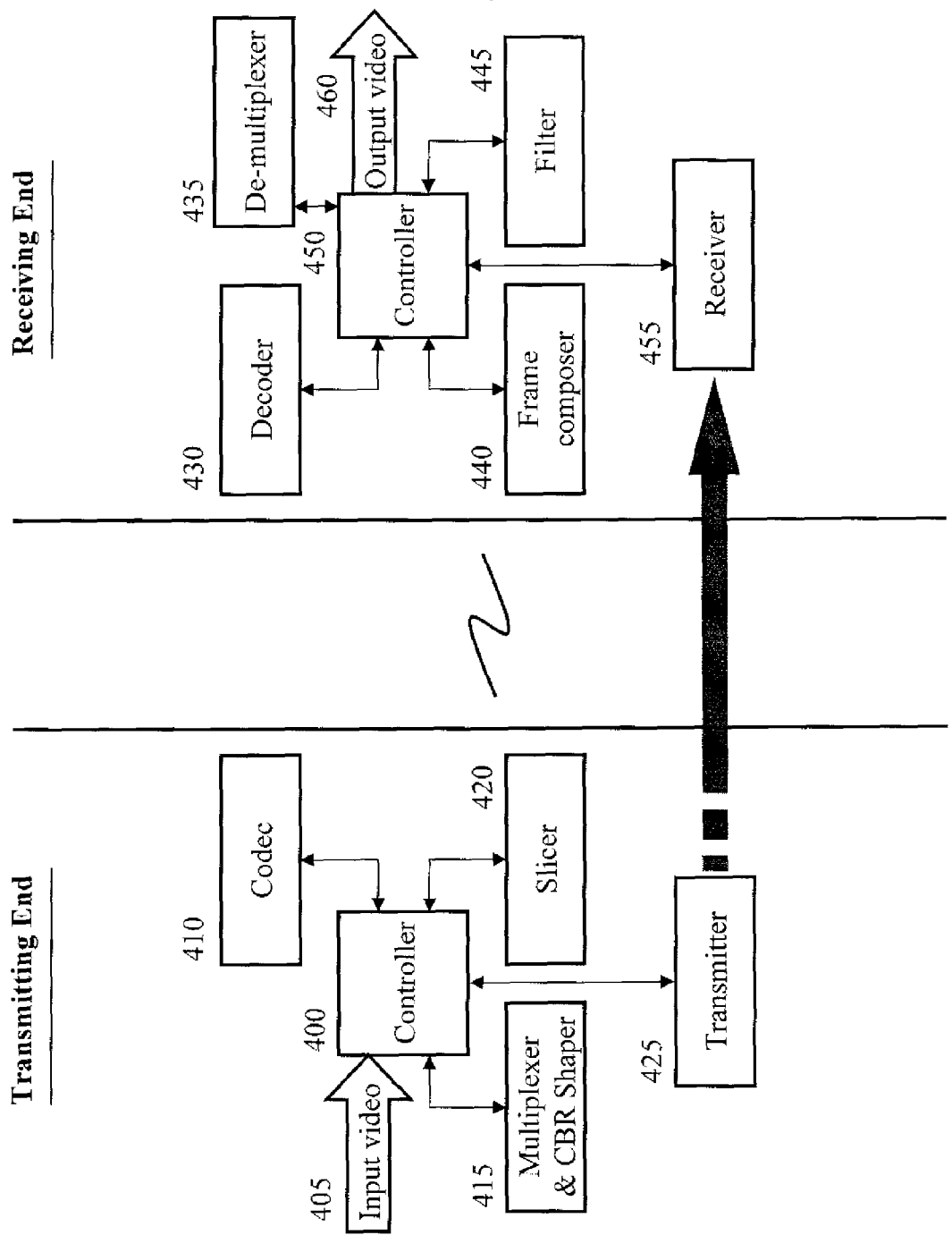
FIG. 4 is a block diagram illustrating the logical components of the disclosed system in the transmitting end and in the receiving end in accordance with the some embodiments of the present invention.

FIG. 4 is a block diagram illustrating the logical components of the present invention on the transmitting end and on the receiving end. Controller 400 manages all the activity on the transmitting end. It receives the input video stream 405 and activates the slicing procedure performed by slicer 420. Compression of the slices is performed by codec 410 and all slices are compounded by dedicated multiplexer 415. Transmitter 425 communicates with receiver 455 over the communication line.

On the receiving end controller 450 manages the procedure which produces the output video 460. The data received by receiver 455 is decompounded by dedicated de-multiplexer 435 and decompressed by decoder 430. De-multiplexer 415 and decoder 430 on the receiving end are compatible to multiplexer 415 and codec 410 on the transmitting end accordingly. The protocols of the multiplexer de-multiplexer layers have the capabilities of handling the synchronization logic, fragmentation, reassembly and sequencing of packets. The decompression procedure generates an independent slice image per each video slice. The multiple video streams are then recomposed by frame composer 440. Frame composer 440 assembles decompressed slices into reconstructed. According to some embodiments the reconstructed video frame maintained approximately at least some of the features of the original video frame. Frame composer 440 is responsible for synchronization, error correction and restoring the frame. The decoded video stream is processed in a way which enables video filters like de-blocking and de-ringing to be activated on the whole frame and eliminate the slicing artifacts. De-blocking and de-ringing filter 445 can be activated in horizontal, vertical, luminance and chrominance simultaneously to produce output video 460.

Figure 5:
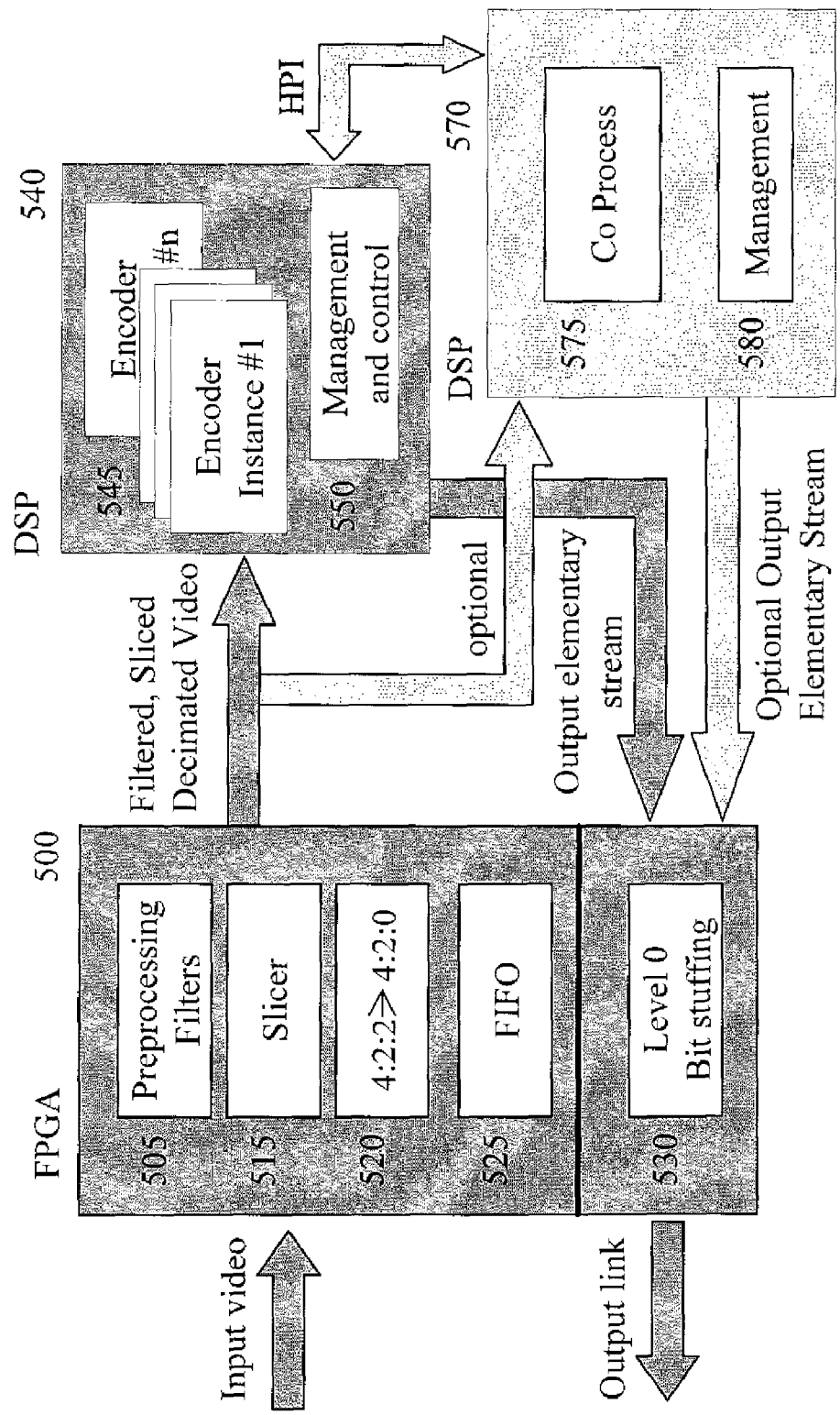
FIG. 5 is a block diagram illustrating the encoder in accordance with the some embodiments of the present invention.

FIG. 5 is a block diagram providing a more detailed account of the encoding components on the transmitting end in accordance with some embodiments of the present invention. Field-Programmable Gate Array (FPGA) 500 receives the input video. FPGA 500 includes preprocessing filter 505, slicer 515, video format converter 520 and buffers 525 for processing the incoming stream. Buffer size may be determined according to the size of the slices to ensure maximal transference efficiency. FPGA 500 also includes a bit stuffing component 530 used before data dispatch. Having been filtered, sliced and processes by FPGA 500, the video data is transferred to Digital Signal Processing (DSP) component 540. DSP 540 includes encoder 545 and management and control component 550. Encoder 545 performs the encoding procedure on each instance of the video data received from FPGA 500 and outputs the elementary stream. The stream is fed into bit stuffing component 530 to adjust data and frames to suit communications protocols. Slices video is optionally fed into an additional DSP 570 which is composed of co processor 575 and management unit 580 for additional processing functions like video stabilizing by slices, or inter-slice information processing to allow better bit rate variance performance.

Figure 6:
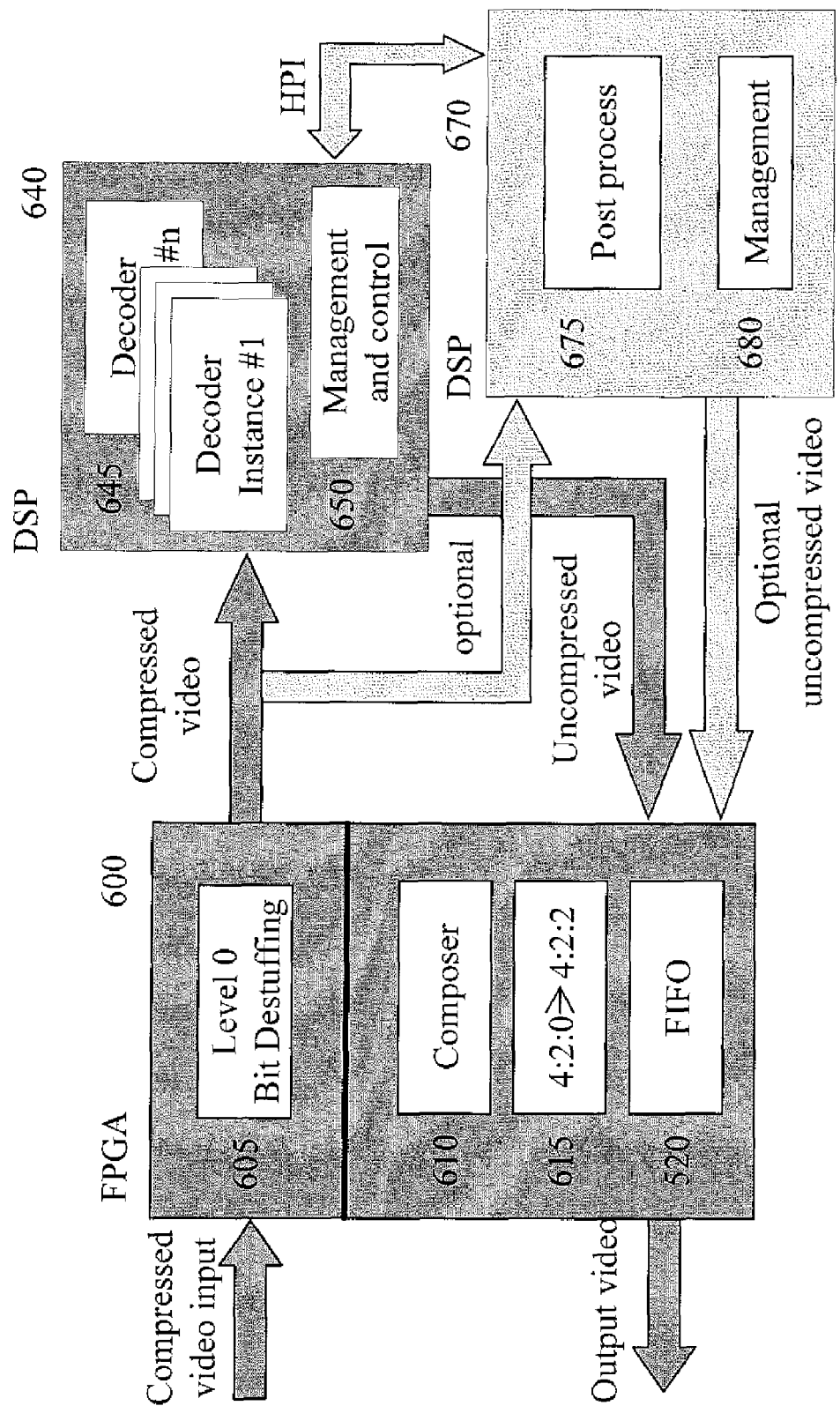
FIG. 6 is a block diagram illustrating the decoder in accordance with the some embodiments of the present invention.

FIG. 6 is a block diagram providing a more detailed account of the decoding components on the receiving end in accordance with some embodiments of the present invention. The transmitted data is fed into FPGA 600. Bit de stuffing component 605 truncates the extra bits added by stuffing component 530. The compressed video data is transferred to DSP 640 where each instance is decoded by decoder 645, this processed is managed by management and control component 650. The uncompressed data is then fed back into FPGA 600 to be recomposed by frame composer 610, and video format is readjusted by format converter 615 using buffer 520. The restored video is then outputted.

Uncompressed video is optionally fed into an additional DSP 670 which is composed of post processor 675 and management unit 680 for additional post processing functions like based de-blocking that removes the boundaries artifacts.

Figure 7:
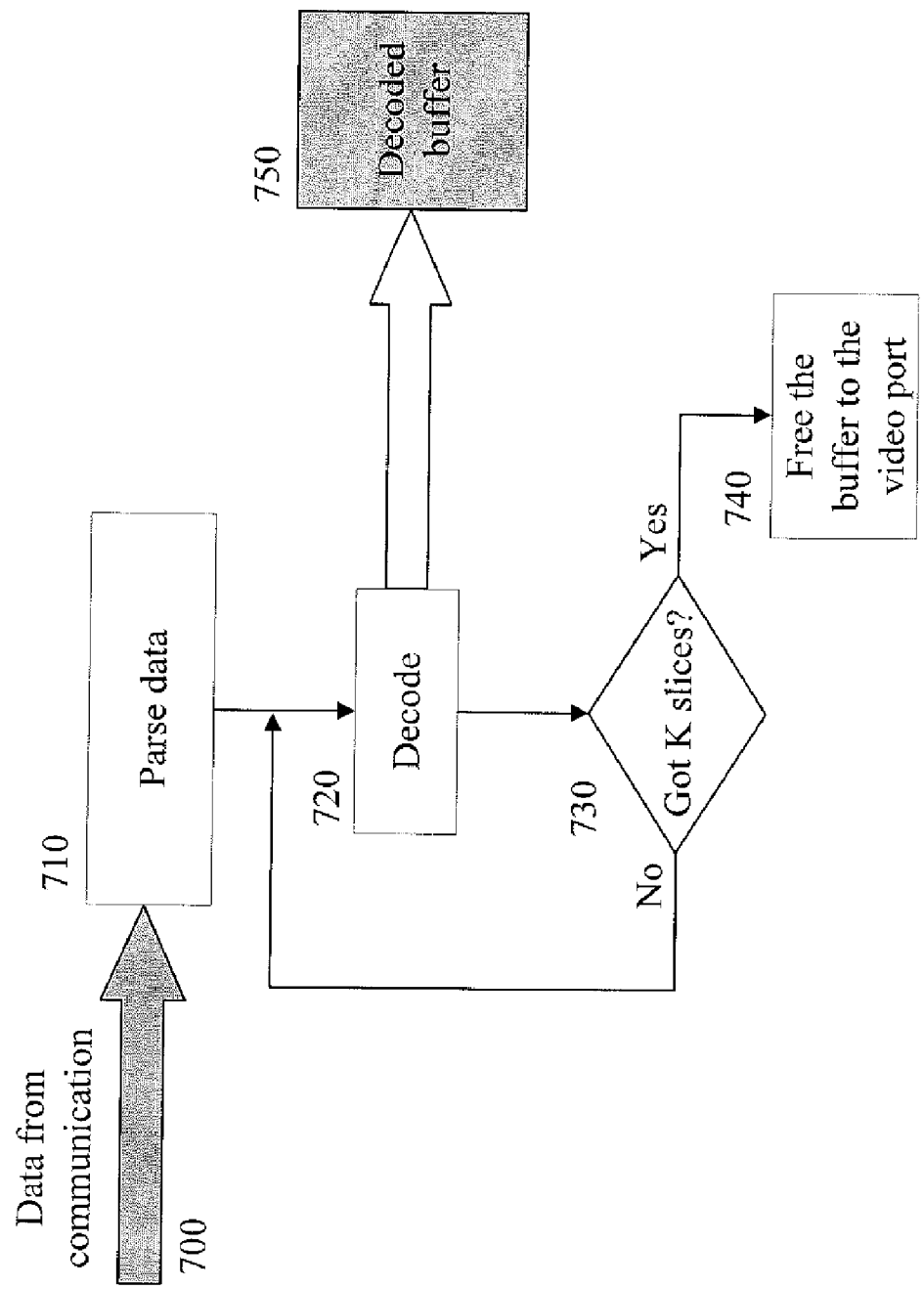
FIG. 7 is a flowchart illustrating the video data flow in accordance with the some embodiments of the present invention.

FIG. 7 is a flowchart illustrating video data flow on the receiving end in accordance with the some embodiments of the present invention. Processed video data 700 is received from the communication line. The data is then parsed to recreate the frame slices (step 710). Each slice is then decoded (step 720) and stored in decoding buffer 750. The process waits until a predetermined number of slices (K) are stored in decoding buffer 750 (step 730) before transmitting the data stored in it to the video port (step 740).

According to additional embodiments of the present invention the video stream may be generated from more than one source. The different sources may communicate via a communication line and are transmitted simultaneously. According to these embodiments the reference frame of one of the sources may be transmitted in the same stream of other video sources.

FIG. 8 is a exemplary image illustrating of a sliced video frame including an example of selected region of interest 800. In this example the region of interest includes partial areas of four slices. According to some embodiments of the present invention the region of interest is regarded as independent video source and transmitted as separate video steam, hence the region 800 is processed separately including slicing, compressing etc.

While the above description contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A method for transferring real-time video of at least two video sources through a communication network, wherein said stream is compressed using standard codec technique, said method comprising the step of:
   dividing each video frame into a predetermined number of slices, wherein each slice is compressed separately; and
   transmitting a reference frame relating to at least one video frame slice,
   wherein the at least two video streams from different sources are transmitted simultaneously, further comprising the step of transmitting the reference frame of one video source at the same stream of a second video source stream,
   wherein each slice is compressed separately at different point of time,
   wherein the transmitting is carried out at a different point of time.

2. The method of claim 1, further receiving the at least two video streams from different video stream sources.

3. A method of maximizing throughput effectiveness and minimizing constant bitrate and latency in real-time video streaming, the method comprising:
   dividing each frame of a video stream comprising a sequence of frames into a plurality of slices on the transmitting end;
   marking a slice in each frame of the video as a reference frame;
   compressing each one of the plurality of slices into compressed slices;
   multiplexing, over a time frame, groups of the compressed slices into compound units located at different points along the time frame, as preparation for transmitting, to yield flatten bursts of data representing the compound units; and
   transmitting the compound units of at least two video sources to the receiving end.

4. The method according to claim 3, wherein the dividing, marking, compressing and multiplexing over a time frame is of at least two video streams from different sources which are transmitted simultaneously, further transmitting a reference frame of one video source at the same stream of a second video source stream.

5. The method according to claim 3, further demultiplexing and decompressing the compound units on the receiving end using the reference frame.

* * * * *